(12) United States Patent
Waggoner

(10) Patent No.: US 10,322,561 B2
(45) Date of Patent: Jun. 18, 2019

(54) RAPID SOLID-STATE FOAMING

(71) Applicant: Grow Plastics LLC, Berkeley, CA (US)

(72) Inventor: Michael Waggoner, Seattle, WA (US)

(73) Assignee: Grow Plastics LLC, Berkeley, CA (US)

( * ) Notice: Subject to any disclaimer, the term of this patent is extended or adjusted under 35 U.S.C. 154(b) by 282 days.

(21) Appl. No.: 14/930,592

(22) Filed: Nov. 2, 2015

(65) Prior Publication Data
US 2016/0122489 A1 May 5, 2016

Related U.S. Application Data

(60) Provisional application No. 62/073,872, filed on Oct. 31, 2014.

(51) Int. Cl.
B29C 44/02 (2006.01)
B32B 5/20 (2006.01)
(Continued)

(52) U.S. Cl.
CPC ............ B32B 5/20 (2013.01); B29C 44/02 (2013.01); B32B 5/145 (2013.01); B32B 27/065 (2013.01);
(Continued)

(58) Field of Classification Search
CPC ..................... B29C 44/02; B29C 44/3453
See application file for complete search history.

(56) References Cited

U.S. PATENT DOCUMENTS 3,883,625 A 5/1975 Thomas et al.
4,455,272 A 6/1984 Schubert et al.
(Continued)

FOREIGN PATENT DOCUMENTS

EP 14 81 4566 2/2017
JP H10-235668 A 9/1998
WO WO 2014/205180 A3 12/2014

OTHER PUBLICATIONS

Machine translation of JP 2006-044726 by Kawashima et al. (Year: 2006).*

(Continued)

Primary Examiner — Michael M Dollinger
Assistant Examiner — Christina H Wales

(57) ABSTRACT

Disclosed, among other things, are ways to manufacture reduced density thermoplastics using rapid solid-state foaming and machines useful for the saturation of plastic. In one embodiment, a foaming process may involve saturating a semi-crystalline polymer such as Polylactic Acid (PLA) with high levels of gas, and then heating, which may produce a reduced density plastic having high levels of crystallinity. In another embodiment, a foaming process may produce layered structures in reduced density plastics with or without integral skins. In another embodiment, a foaming process may produce deep draw structures in reduced density plastics with or without integral skins. In yet another embodiment, a foaming process may utilize additives, blends, or fillers, for example. In yet another embodiment, a foaming process may involve saturating a semi-crystalline polymer such as Polylactic Acid (PLA) with high levels of gas, and then heating, which may produce a reduced density plastic having high levels of crystallinity.

29 Claims, 11 Drawing Sheets

(51) Int. Cl.
| | |
|---|---|
| *C08J 9/00* | (2006.01) |
| *F16J 15/40* | (2006.01) |
| *B65D 65/38* | (2006.01) |
| *C08J 9/12* | (2006.01) |
| *C08J 9/34* | (2006.01) |
| *C08J 9/36* | (2006.01) |
| *B32B 5/14* | (2006.01) |
| *B32B 27/06* | (2006.01) |
| *B29K 67/00* | (2006.01) |
| *B29K 105/04* | (2006.01) |
| *B29L 31/00* | (2006.01) |
| *B29C 44/34* | (2006.01) |

(52) U.S. Cl.
CPC ............... *B65D 65/38* (2013.01); *C08J 9/00* (2013.01); *C08J 9/0061* (2013.01); *C08J 9/0066* (2013.01); *C08J 9/0085* (2013.01); *C08J 9/122* (2013.01); *C08J 9/34* (2013.01); *C08J 9/365* (2013.01); *F16J 15/40* (2013.01); *B29C 44/3453* (2013.01); *B29K 2067/046* (2013.01); *B29K 2105/04* (2013.01); *B29K 2105/045* (2013.01); *B29K 2995/006* (2013.01); *B29L 2031/7132* (2013.01); *B32B 2262/067* (2013.01); *B32B 2262/101* (2013.01); *B32B 2266/0264* (2013.01); *B32B 2307/306* (2013.01); *B32B 2307/50* (2013.01); *B32B 2307/538* (2013.01); *B32B 2307/558* (2013.01); *B32B 2307/704* (2013.01); *B32B 2307/7163* (2013.01); *B32B 2307/72* (2013.01); *B32B 2307/7244* (2013.01); *B32B 2307/7246* (2013.01); *B32B 2307/75* (2013.01); *B32B 2435/02* (2013.01); *B32B 2439/00* (2013.01); *B32B 2439/70* (2013.01); *C08J 2201/032* (2013.01); *C08J 2203/06* (2013.01); *C08J 2205/044* (2013.01); *C08J 2205/048* (2013.01); *C08J 2207/00* (2013.01); *C08J 2300/16* (2013.01); *C08J 2367/04* (2013.01); *C08J 2400/16* (2013.01); *C08J 2403/02* (2013.01); *C08J 2467/02* (2013.01); *Y02W 90/12* (2015.05)

(56) References Cited

U.S. PATENT DOCUMENTS

| | | |
|---|---|---|
| 5,444,113 A | 8/1995 | Sinclair et al. |
| 5,723,510 A | 3/1998 | Kabumoto et al. |
| 5,866,053 A | 2/1999 | Park et al. |
| 6,232,354 B1 | 5/2001 | Tan |
| 7,670,545 B2 † | 3/2010 | Bopp |
| 8,080,194 B2 | 12/2011 | Nadella et al. |
| 8,377,548 B2 | 2/2013 | Nadella et al. |
| 8,858,849 B2 † | 10/2014 | Nadella |
| 8,877,331 B2 † | 11/2014 | Nadella |
| 8,926,876 B2 † | 1/2015 | Kumar |
| 9,770,854 B2 † | 9/2017 | Branch |
| 2007/0148384 A1 | 6/2007 | Bowden et al. |
| 2007/0179253 A1 | 8/2007 | Matsuoka et al. |
| 2009/0104420 A1 | 4/2009 | Nadella et al. |
| 2009/0309250 A1* | 12/2009 | Nadella ............... B29C 44/3446 264/51 |
| 2010/0052201 A1 | 3/2010 | Nadella |
| 2010/0062235 A1* | 3/2010 | Nadella ................... B32B 27/06 428/213 |
| 2010/0086758 A1* | 4/2010 | Takase ................... C08J 9/0023 428/219 |
| 2010/0136338 A1 | 6/2010 | Hiarai et al. |
| 2010/0297416 A1* | 11/2010 | Kumar ................... B32B 27/08 428/220 |
| 2011/0003133 A1* | 1/2011 | Kumar ..................... C08J 9/122 428/304.4 |
| 2012/0225961 A1 | 9/2012 | Van Horn et al. |
| 2013/0303643 A1* | 11/2013 | Nadella ............... B29C 44/3446 521/95 |
| 2013/0303645 A1 | 11/2013 | Dix et al. |
| 2014/0377530 A1 | 12/2014 | Waggoner |
| 2016/0045879 A1* | 2/2016 | Kumar ...................... B01J 3/02 521/50 |
| 2016/0121577 A1 | 5/2016 | Waggoner |

OTHER PUBLICATIONS

Wang, X.; Kumar, V.; Li, W. Development of Crystallization in PLA During Solid-State Foaming Process Using Sub-Critical CO2. Cellular Polymers, vol. 31, No. 1, 2012. pp. 1-18. (Year: 2012).*

"The Ideal Gas Law" by University of Waterloo. Accessed at http://www.science.uwaterloo.ca/~cchieh/cact/c120/idealgas.html via Wayback Machine, date Jun. 4, 2004. (Year: 2004).*

Cha, S. W., "A microcellular foaming/forming process performed at ambient temperature and a super-microcellular foaming process," Dissertation, Massachusetts Institute of Technology, Apr. 1994, 164 pages.

Final Office Action dated Nov. 1, 2016 for U.S. Appl. No. 14/308,959, 13 pages.

Final Office Action dated Feb. 20, 2018 for U.S. Appl. No. 14/308,959, 15 pages.

Materials Safety Data Sheet for Polylactic Acid; Jul. 7, 2008, 2 pages.

Non-Final Office Action dated Feb. 16, 2016 for U.S. Appl. No. 14/308,959, 6 pages.

Non-Final Office Action dated Jun. 1, 2017 for U.S. Appl. No. 14/308,959, 14 pages.

Partial Supplementary European Search Report dated Jan. 25, 2017 for European Application No. 14814566.7, 8 pages.

\* cited by examiner
† cited by third party

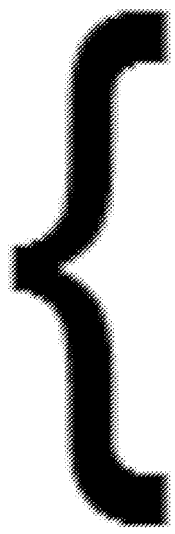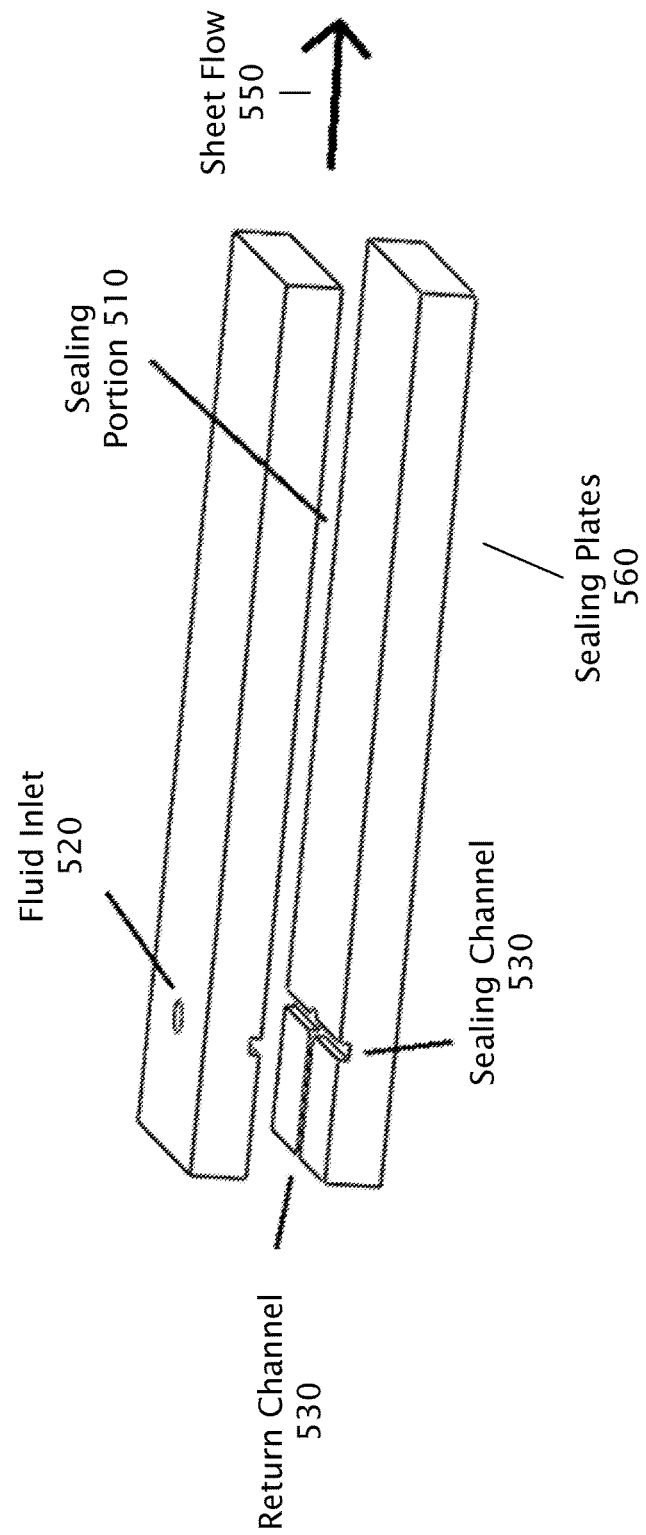

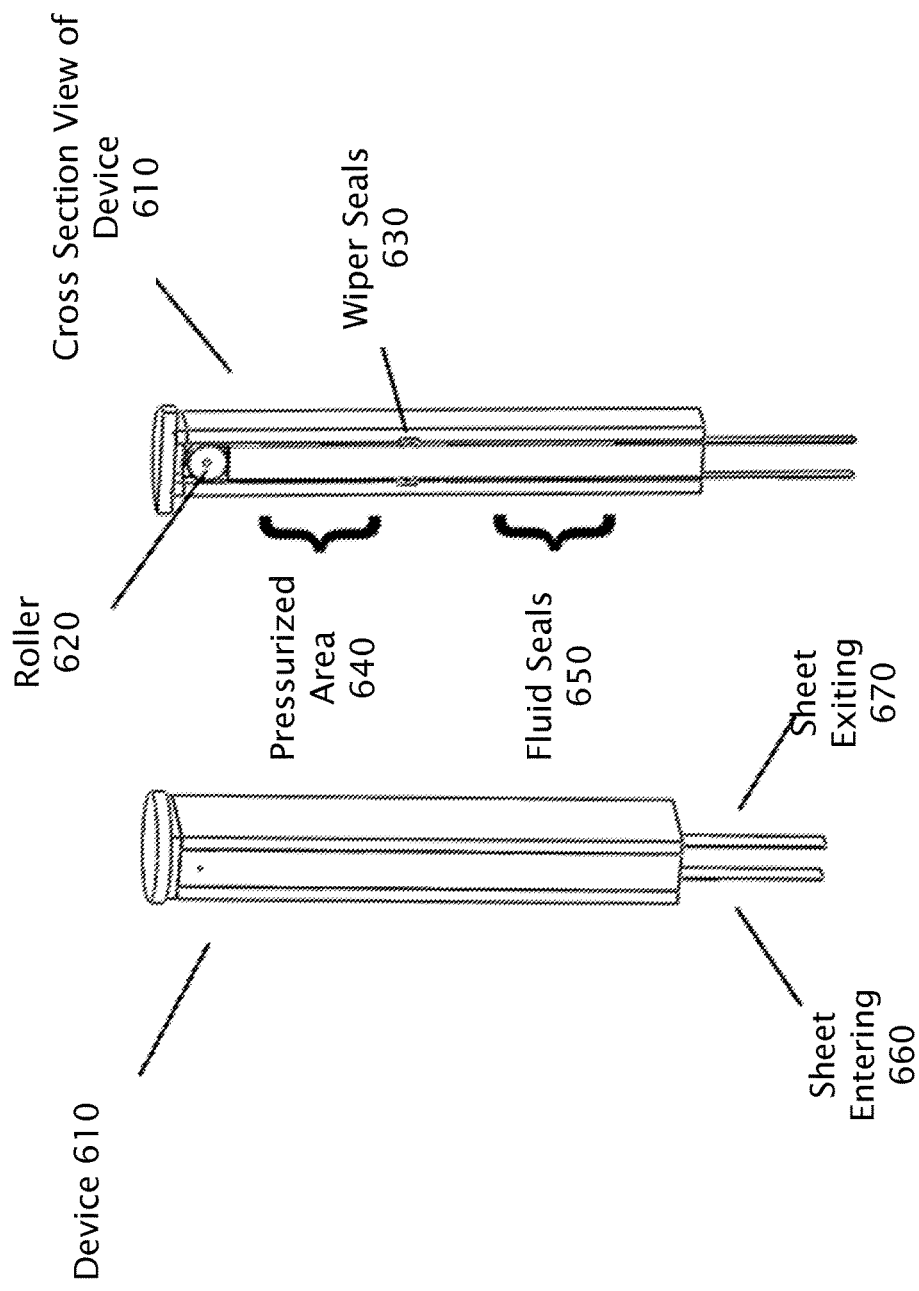

RAPID SOLID-STATE FOAMING

CROSS-REFERENCE TO RELATED APPLICATIONS

This application claims priority to and the benefit of U.S. Provisional Patent Application Ser. No. 62/073,872, filed Oct. 31, 2014, entitled "Reduced Density Thermoplastics," the disclosure of which is hereby incorporated by reference in it entirety.

FIELD

This disclosure relates generally to rapid solid-state foaming of thermoplastics.

BACKGROUND

Plastics are widely used in both durable and non-durable applications. The majority of non-durable plastics are used in initial packaging of goods and food service packaging, often in single use applications.

Using solid-state foaming for producing layered cellular structures in the context of a batch process may take hours to diffuse gas into the sheet, and the gas begins to diffuse from the sheet upon removal from a pressure vessel. The uneven amount of time in processing a roll after removal from a pressure vessel may result in non-uniform foam properties. The long processing times and resulting non-uniformity in rolls may require a large number of large, expensive pressure vessels in order to process plastic continuously.

For example, U.S. Pat. No. 8,591,799 teaches that 2 hours to 60 days are needed for saturating the solid with the inert gas. (col 5, lines 10-27). Thermoplastic polymers disclosed include polycarbonate, polypropylene, polyethylene, polyethylene terephthalate, polyvinyl chloride, poly(lactic acid), acrylonitrile butadiene styrene, and poly styrene. (col 4, lines 48-53) Pressures of 3-7.5 MPa are taught by that patent. (col 2, lines 23-27).

U.S. Pat. No. 8,377,548 utilizes 72 hours in Example 1 and 36 hours in Example 2 for the inert gas diffusion step. Disclosed thermoplastic materials included PET, PEEK, PEN, PBT, PLA, PHA, and thermoplastic urethane. (abstract). Examples 1 and 2 utilized PET polymer, CO2 gas and a pressure of 5 MPa.

SUMMARY

The instant application discloses, among other things, rapid solid-state foaming of thermoplastics. Rapid saturation methods for producing layered cellular structures in thermoplastic polymers may include exposing a thermoplastic polymer blank to a gas or fluid at a pressure of at least 500 pounds per square inch (PSI) for a time that does not exceed 10 minutes, followed by heating the polymer blank. Existing processes would not allow exposure to the inert gas for such a short time to be effective in producing a layered cellular structure. This short exposure time may make such a process commercially viable.

BRIEF DESCRIPTION OF THE DRAWINGS

FIG. 5 is a schematic for a dynamic seal, according to one embodiment.

FIG. 6 illustrates an embodiment of a continuous saturation device with a single festoon.

Like reference numerals are used to designate like parts in the accompanying drawings.

DETAILED DESCRIPTION

Figure 1:
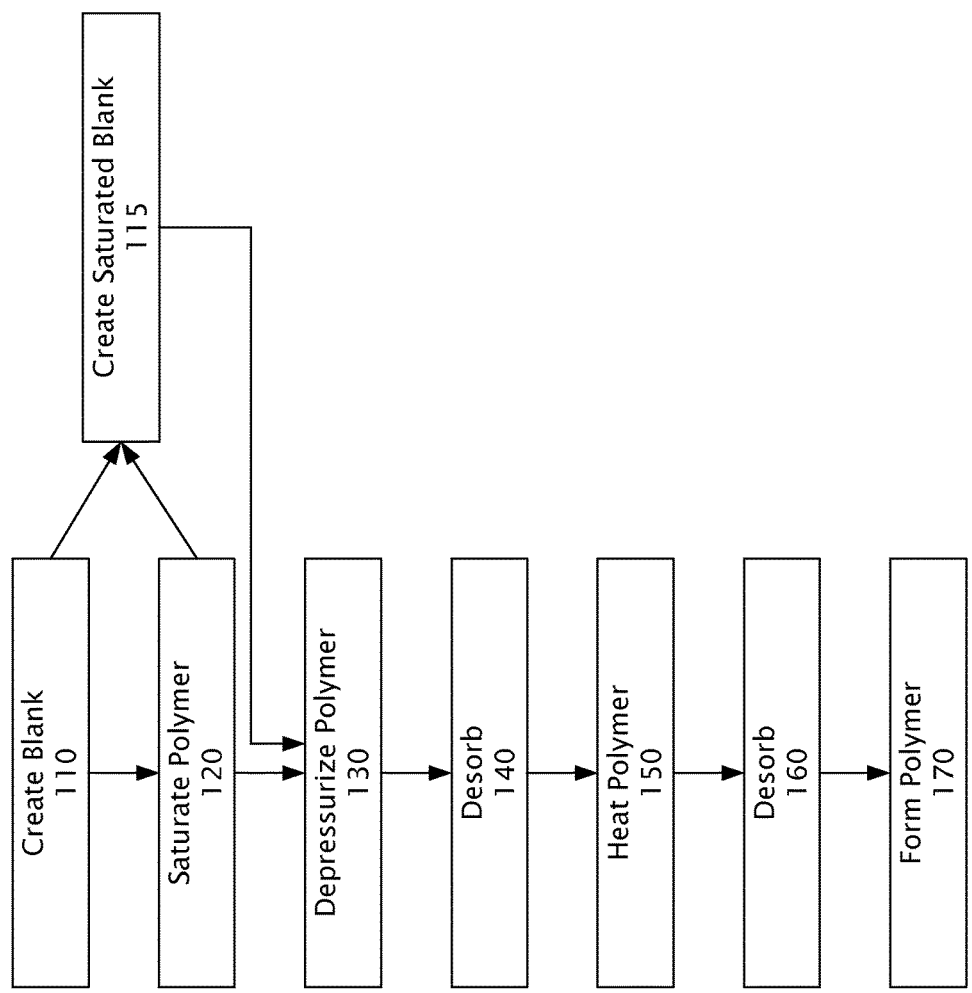
FIG. 1 is a flowchart for creating polymer foams, according to one embodiment.

A more particular description of certain embodiments of Rapid Solid-State Foaming may be had by references to the embodiments described below, and those shown in the drawings that form a part of this specification, in which like numerals represent like objects.

FIG. 1 is a flowchart illustrating a method of creating reduced density plastic parts. Create Blank 110 involves the generation of polymer blank to be saturated. This step may include injection molding, polymer extrusion, multi-layered polymer extrusion, or compression molding of a sheet. Saturate Polymer 120 may involve placing the polymer blank in an atmosphere under high pressure so that high-pressure gas or fluid permeates the polymer in a manner similar to water going into a sponge. This may be accomplished by placing the blank in a pressure vessel, or by feeding a sheet through a continuous saturation device. The pressure vessel may be filled with a gas including carbon dioxide, and may include a solvent such as water. It may be possible to combine steps 110 and 120 into a single step of creating to Create Saturated Blank 115. This may be accomplished by introducing a foaming agent into an extruder or injection molder, and allowing the blank to cool in a pressurized environment prior to depressurizing. The Saturated Blank may then be removed from a pressurized environment using a dynamic seal or pressure lock system. At Depressurize Polymer 130, the pressure from the pressure vessel may be released at a controlled rate. Desorb 140 may be an optional step in the process, in which some of the gas is allowed to desorb from the polymer in a controlled environment, for example, a lower pressure or ambient conditions. At Heat Polymer 150, the saturated blank may be heated, initiating foaming of the polymer. If a flat object is desired, the process may be ended at this point. Desorb 160 is an optional step in which some gas may be further allowed to escape prior to forming the object. At Form Polymer 170, the polymer may be heated and formed into a useful shape, such as a dinner plate or drink cup. This step may be performed on conventional thermoforming equipment, in which the foamed sheet is heated, and then drawn into shape using air pressure, mechanical force, or a combination thereof. Forming may also include folding and bonding processes similar to those used in creating products from paper.

Saturation parameters may include gas foaming agent used, pressure, temperature, humidity, solvent used, and time. Varying these parameters may provide reduced density thermoplastics with differing properties, including strength, crystallinity, layer structure, insulation value, and flexibility.

One embodiment utilizes Polylactic acid (PLA), a biodegradable polymer, resulting in reduced density bioplastic structures. These methods may be applied to most thermoplastics and thermoplastic blends by varying processing conditions. The end products will be compostable provided all constituent materials are compostable.

The term biodegradable polymer is used in this application to represent a polymer that will degrade under certain conditions. Example conditions include those prescribed by ASTM D6400, after being planted in soil for one year, or in the presence of certain solvents and/or enzymes. The biodegradable polymer may be composed of a blend of bio-based polymers, petroleum-based polymers, and any additives that are useful in the processing of these polymers or in the use of final end products.

Figure 2:
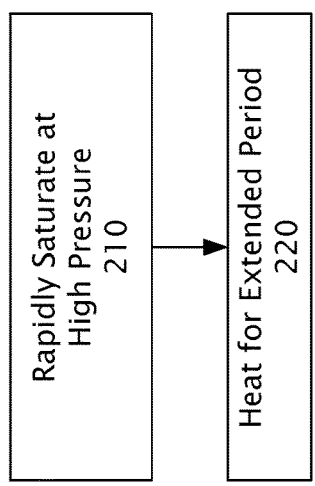
FIG. 2 is a flowchart for creating polymer foams through a rapid process, according to one embodiment.

FIG. 2 is a flowchart for creating polymer foams using a rapid solid-state foaming process, according to one embodiment. Traditionally, solid-state foaming has been a process that may involve many hours or days of saturation time. At Rapidly Saturate at High Pressure 210, a polymer sample may be saturated at high pressures for a short amount of time. An example of this application is saturating polylactic acid sheet of a thickness of 0.024" inches this for 3 minutes at 900 PSI. At Heat for Extended Period 220, the sample is heated for an extended amount of time. For example, 15 to 60 seconds of heating at an elevated temperature may be found to be effective. Supercritical saturation conditions have been found to be effective in polymers with slower diffusion rates. In general, saturation times under 15 minutes above pressures of 500 PSI may be of use in generating polymers.

These conditions may be useful in applications with semicrystalline polymers, including PLA and PET. A layer with increased crystallinity levels may form near the surface of the polymer blank during saturation, and after removal due to the high internal pressure of gas near the surface. Highly crystalline sections of the polymer have lower diffusivity than more amorphous sections. The crystalline outer layers may effectively encourage the diffusion of gas towards the center of the polymer during heating.

In Heat for Extended Period 220, the temperature of the Saturated Polymer Blank may be increased to a temperature slightly below that used for thermoforming a polymer. This softened plastic state may enable the diffusion of foaming agent throughout the polymer blank.

Figure 3:
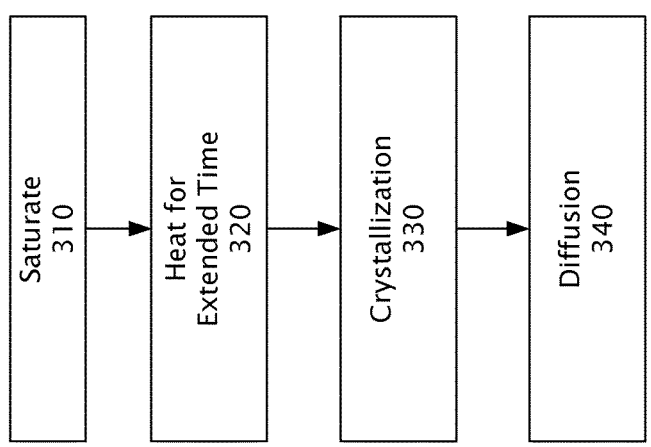
FIG. 3 is a flowchart for creating semi-crystalline, low-density thermoplastic structures with high service temperatures, according to one embodiment.

FIG. 3 is a flowchart for creating semi-crystalline, low-density thermoplastic structures with high service temperatures, according to one embodiment. This may be useful in the field of biodegradable polymers, which have traditionally exhibited low service temperatures.

At Saturate 310, a polymer blank may be saturated. The crystallinity of the polymer sample may be raised during this step by the presence of $CO_2$ in the polymer, either throughout or at the surface of the sample. At Heat for Extended Time 320, holding the sample at an elevated temperature for a long period may bring about Crystallization 330 of the sample, raising its service temperature.

This technique, in combination with that described in FIG. 2, may be used in highly crystallizable blends of PLA such as Natureworks™ 2500 HP and 4032D, using PLA/biodegradable polymer blends with elevated service temperatures, or in the use of PLA with fillers. Natureworks™ 2500 HP saturated for 3 minutes at 900 PSI, then heated at a temperature of 99 Celsius in a water bath held over 95° C. for at least 15 seconds has been shown to exhibit adequate service temperatures to withstand boiling water on one side when shaped into shallow draw bowls. Different combinations of heating rate and time may be used to generate crystallinity in the sample. Longer heating times may be required for polymers that crystallize less rapidly. Crystallizing additives may reduce the heating time necessary to generate crystallinity in the polymer.

Figure 4:
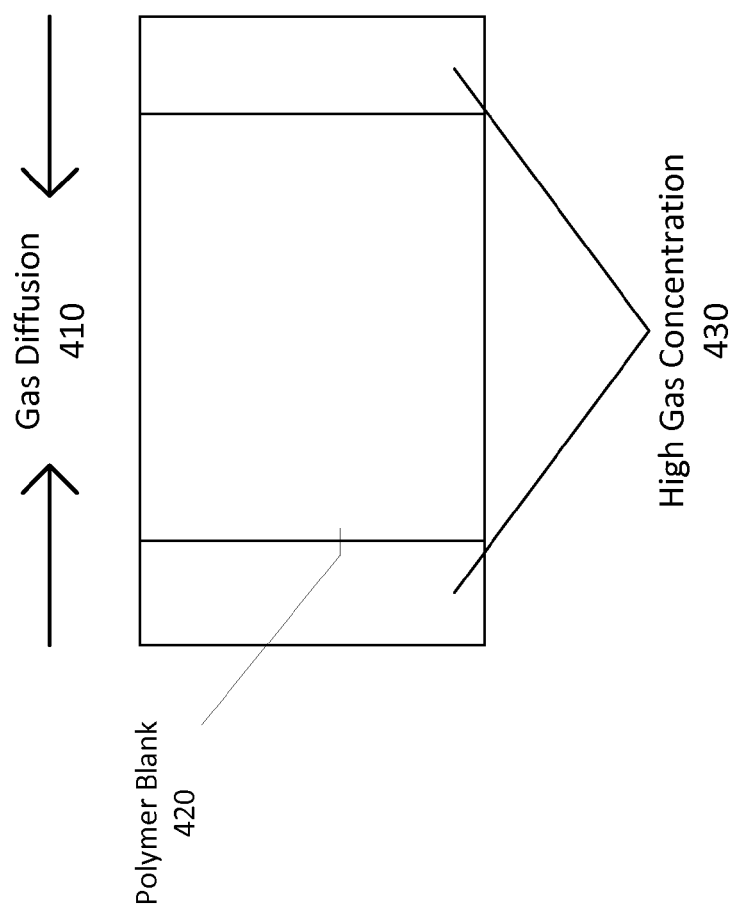
FIG. 4 illustrates gas diffusion that occurs during a rapid saturation process, according to one embodiment.

The extended heating time also encourages the Diffusion 340 over time, as illustrated in FIG. 4, wherein a high gas concentration at the surface of the polymer blank diffuses towards the center of the sample. The elevated temperature may increase the fugacity of the gas held in the sample, and may also decrease the resistance of diffusion within the polymer. Crystallization 330 and Diffusion 340 may occur simultaneously in some embodiments.

The short duration of time in the pressure vessel is a benefit in processing semi-crystalline polymers because it will increase the crystallinity of the polymer to a less degree than a longer saturation time would. A high degree of crystallinity would generate small cells in the polymer that are not as effective at reducing densities as large cells.

FIG. 4 illustrates Gas Diffusion 410 that occurs during a rapid saturation process. Polymer Blank 420 may be not completely saturated in a pressure vessel, but High Gas Concentration 430 near a surface of a polymer blank may be sufficient to enable gas diffusion through the remainder of the polymer. The crystallization of semi-crystalline polymers under high $CO_2$ pressures may be reduced compared to traditional processes with lower pressures.

When saturating highly crystallizable of polylactic acid such as Natureworks™ 2500 HP, or blends of Natureworks™ 4032D or Natureworks™ 2003D with crystallizing additives, high crystallinity levels may inhibit expansion of the polymer. Ethylene bistearamide in concentrations of one to three percent may be an effective crystallizing agent; talc in concentrations of one-half to forty percent has also been found to increase crystallization in PLA. This method may generate a crystalline layer at the surface, but may avoid crystallinity through the whole sample that may inhibit polymer expansion. Lower polymer densities may generate products using less material, and so similar products may be produced at lower cost. If desired, crystallinity may be generated in the parts during heating to induce foaming, and also by heat-setting in a mold after thermoforming.

FIG. 5 is a schematic for a Dynamic Seal 570, according to one embodiment. A polymer sheet (not shown) would enter on the left side of the illustration and exit on the right, where a high-pressure area may exist, creating Sheet Flow 550. The Sealing Portion 510 may be composed of two Sealing Plates 560 which may be composed of metal or other rigid material. Introducing fluid through two Fluid Inlets 520 (located on top and bottom Sealing Plate) will pass through Sealing Channel 530, and also through Return Channel 540.

Dynamic Seal 570 functions by creating a high-pressure area near Fluid Inlet 520, which directs fluid towards an area of high pressure such as a pressure vessel and also in the direction of Sheet Flow 550. A pressure gradient is generated by flow entering the dynamic fluid seal, by mixing of flows around Fluid Inlet 520 and Sealing Channels 530, and by the forcing of working fluid through a set of relatively narrow channels created between the polymer sheet, Sealing Plates

560, and edges of the device and sheet. A Dynamic Seal 570 twelve inches in length has been found to be able to generate a pressure differential of 900 PSI between the exit of Sheet Flow and the Pressure Vessel. The pressure Vessel may be held at 1000 PSI while the exit of the device has a narrow stream of working fluid exiting at pressures of 100 PSI, similar to a pressure one might find in a garden hose. It has been found that maintaining a gap of 0.002 inches to 0.005 inches between the Sealing Plates 560 and polymer sheet, and maintaining a gap between the edges of the polymer sheet and sealing device edges (not shown) of less than 0.020 inches with water as a working fluid is sufficient to maintain this seal. It is noted that using a higher viscosity Working Fluid would decrease flow rates. Using a food contact approved substance such as water, Glycerine, or food-safe hydraulic fluid will enable the production of agricultural and food-contact approved items.

The geometry and location of fluid channels may be changed. The device may function adequately without fluid inlets, drawing fluid for a seal from a central reservoir of a fluid-based continuous saturation device. An important element of this design is an elongated structure with approximately the same shape as the object to be saturated. Fluid traveling parallel to sheet motion in the same or opposite direction through a relatively small gap will create a pressure differential that may function as a dynamic seal.

Cincinnati Test Systems published Application Bulletin #120 in September 2009, which disclosed a formula for estimating liquid flow through a hole, which takes into account diameter and length of the hole. The flow rate through a round hole is proportional to its diameter raised to the fourth power and inversely proportional to the length of the hole. The leakage from this seal may be understood as minimizing the effective diameter while providing a long length of the hole.

Although the design shown illustrates a seal that might be used to remove sheet from a pressure vessel, it can be recognized that the design could have reversed Sheet Flow 550 and allow sheet to enter a pressure vessel. A sheet entering a pressure vessel through such a seal, removing the fluid by a wiper seal, and entering a high-pressure gas chamber could be continuously saturated.

The cross section perpendicular to sheet flow of the seal may have any shape in order to generate different polymer shapes. The cross section of the seal parallel to sheet flow may be varied.

Limiting flow in a dynamic seal may be effected by creating a series of reduced areas for flow, which then expand into a large area. Turbulence would be generated by each restriction, creating a pressure differential.

This seal may be utilized by directly attaching it to a sheet extruder. A pressurized area may be created at the exit of the extruder through the introduction of high-pressure gas, with extruded sheet passing through this dynamic seal. The extruded sheet may incorporate a foaming agent present in the sheet, or a foaming agent may be introduced in a pressurized area between the extruder exit and the Dynamic Seal. This would allow a gas-saturated polymer sheet to cool and not foam until reheated, enabling Create Saturated Blank 115. There may be resistance to sheet motion created by the pressure differential and motion of fluid in a fluid-based seal. Driven wheels may be incorporated directly into the seal to drive the sheet through the seal. For example, there may be a set of four wheels located at the sheet exit and entrance of each seal. The four wheel surfaces may be elastomeric, and may contact the seal near the edges of the sheet in opposed pairs. The wheels may, for example, be driven through motor-driven shafts with axes perpendicular to sheet travel.

FIG. 6 illustrates an embodiment of a continuous saturation Device 610 with a single festoon. Sheet Entering 660 occurs on the left side of the device, passing through a Fluid Seal 650, through Wiper Seals 630, through a pressurized area 640, over a roller 620, and Sheet Exiting 670 through a second set of Fluid Seals. In Pressurized Area 640, a small gap of a few thousands of an inch larger than the sheet size may be used to expose polymer material to a saturating gas or solvent. Minimizing the volume of a Pressurized Area 640 reduces the cost of the system, and reduces risks resulting from rapid decompression or device failure.

This design may be useful in continuous saturation of polymers because it may be designed with a minimum of Pressurized Area volume. All fluid leakage may occur at the bottom of the device, which may allow easy collection. The device may be designed with a Pressurized Area 640 volume of less than 1.5 cubic feet if the working pressures are 600 PSI or less, or a linear interpolation of decreasing volume as pressure increases.

An inexpensive method for constructing this device may be to use 2 metal plates for the exterior surfaces, and a thicker metal plate for the interior surface. The exterior metal plates may be spaced from the interior surface plate using shim to provide room for sheet to pass. The interior metal plate may be machined to allow installation of the roller. A cap may be bolted onto the top of this assembly in order to aid in maintenance and sheet feeding to begin operation of the machine. It may be beneficial to reinforce the material plates by placing a portion of the mechanism inside of another pressure vessel, or attaching an exterior frame meant to reduce the bending stress in the plates when under pressure.

It would be possible to create a device with a similar design, but multiple festoons, in order to generate a longer path for saturation to occur.

Figure 7:
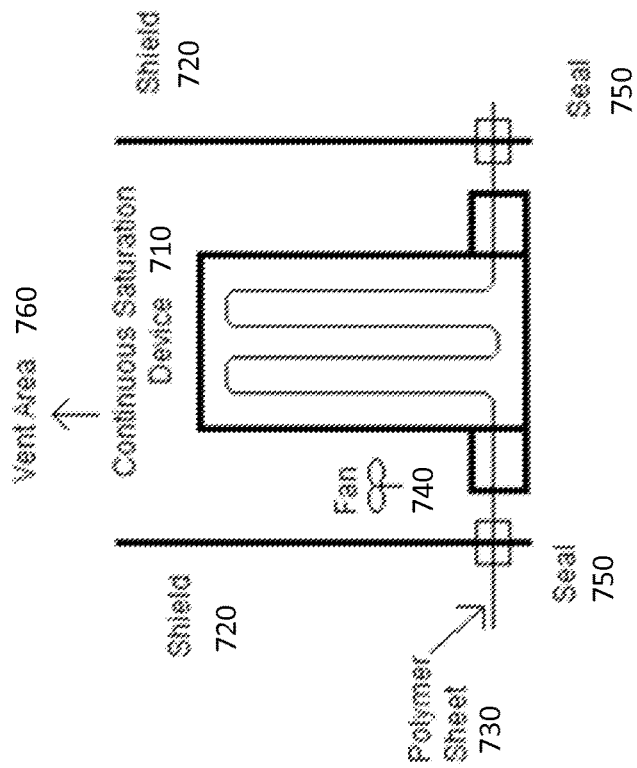
FIG. 7 illustrates a system that may enable the use of continuous saturation devices.

FIG. 7 illustrates a system that may enable the use of continuous saturation devices. Continuous Saturation Device 710 may be placed within Shield 720, through which Polymer Sheet 730 may travel. Shield 720 may be constructed in a significantly lower cost manner than the pressure vessel because it may not need to withstand high pressures. A circulating device, such as a Fan 740, for example, may be used to vent any gas which escapes dynamic Seal 750 of Continuous Saturation Device 710. The gas may be released into Vent Area 760.

Shield 720 may be constructed in such a manner that in the event of a dynamic Seal 750 fail, the gas venting from the pressure vessel is vented to a safe area. The Shield 720 may be constructed to mechanically withstand either seal failure or explosive decompression.

Figure 8:
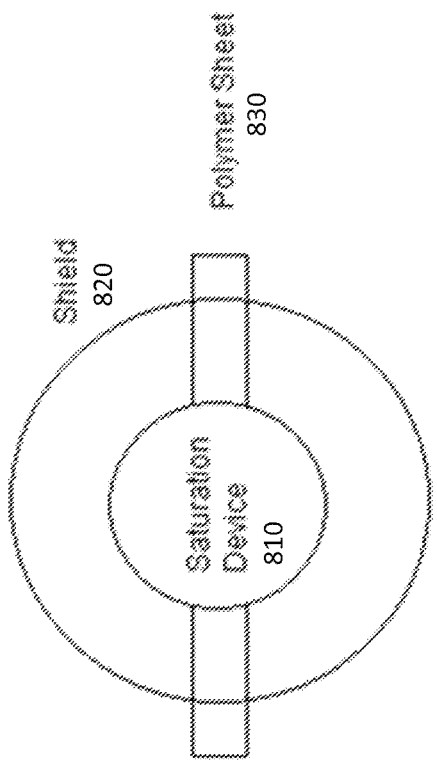
FIG. 8 is an overhead view of a system for continuous saturation of polymers in a safe manner, according to one embodiment.

FIG. 8 is an overhead view of a system for continuous saturation of polymers in a safe manner, according to one embodiment. Saturation Device 810 may be within Shield 820, and Polymer Sheet 830 may pass through both the Shield 820 and Saturation Device 810. Note that the shield may contain a much larger volume than the saturation device; which may reduce the strength required to restrain explosive decompression. Maximizing the vent area of the shield, possibly by extending the shield to the roof of a structure, may be desirable.

It may also be desirable to re-capture and re-pressurize foaming agent from this enclosure. It may be desirable to generate a similar enclosure, or size the enclosure large enough to include a polymer depressurization or foaming area. Recapturing foaming agents from these enclosures would reduce the amount of foaming agent required to generate reduced density polymer structures.

Figure 9:
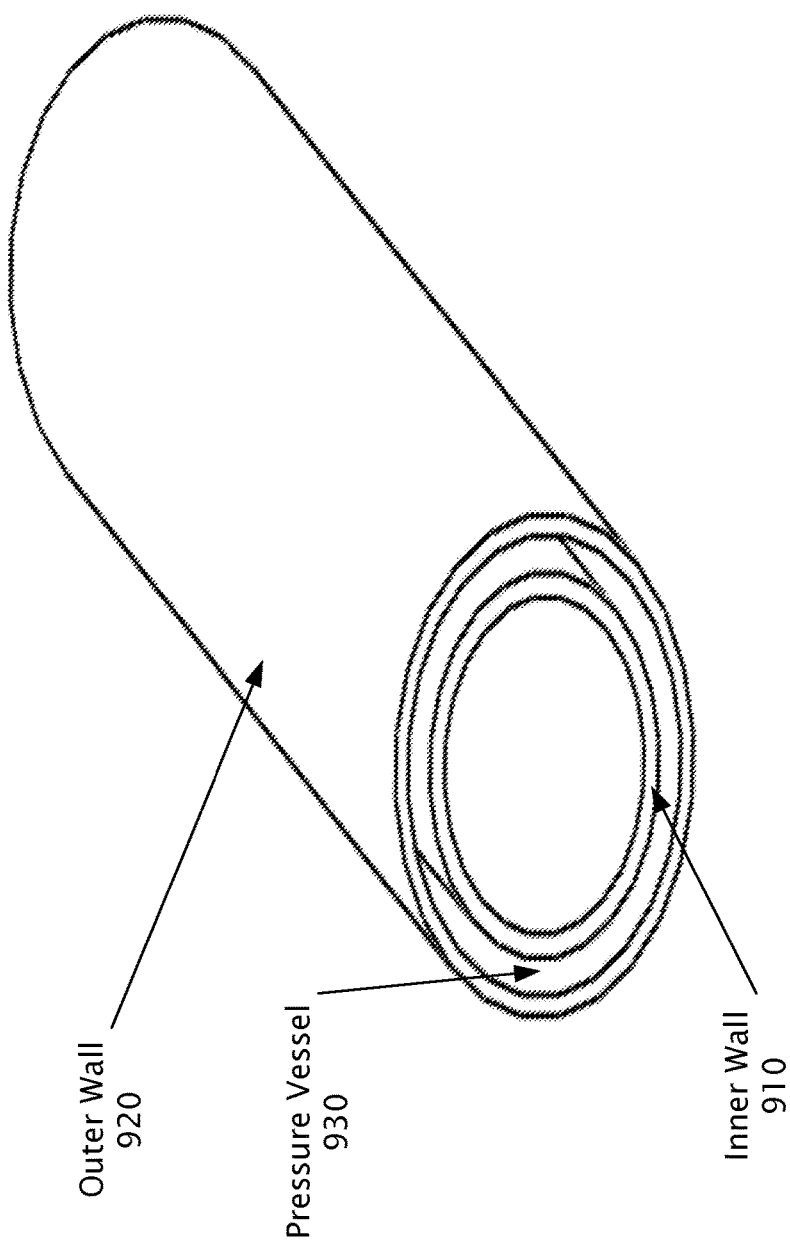
FIG. 9 is a perspective view of a system for continuous saturation of polymers in a safe manner, according to another embodiment.

FIG. 9 is a perspective view of a system for continuous saturation of polymers in a safe manner, according to another embodiment. Inner Wall 910 and Outer Wall 920 may comprise two differently-sized pipes, providing a gap between them. The gap between the pipes can be used to form Pressure Vessel 930. The ends are not shown, but may include elements of dynamics seals to allow sheet to continuously enter and exit the Pressure Vessel 930. A sheet could enter into Pressure Vessel 930 by being wrapped into a circular form, and entering and exiting through a dynamic seal. The sheet could also wrap around Inner Wall 910 at an angle of approximately 45 degrees to its axis, traversing through Pressure Vessel 930 as it wraps around Inner Wall 910.

Figure 10:
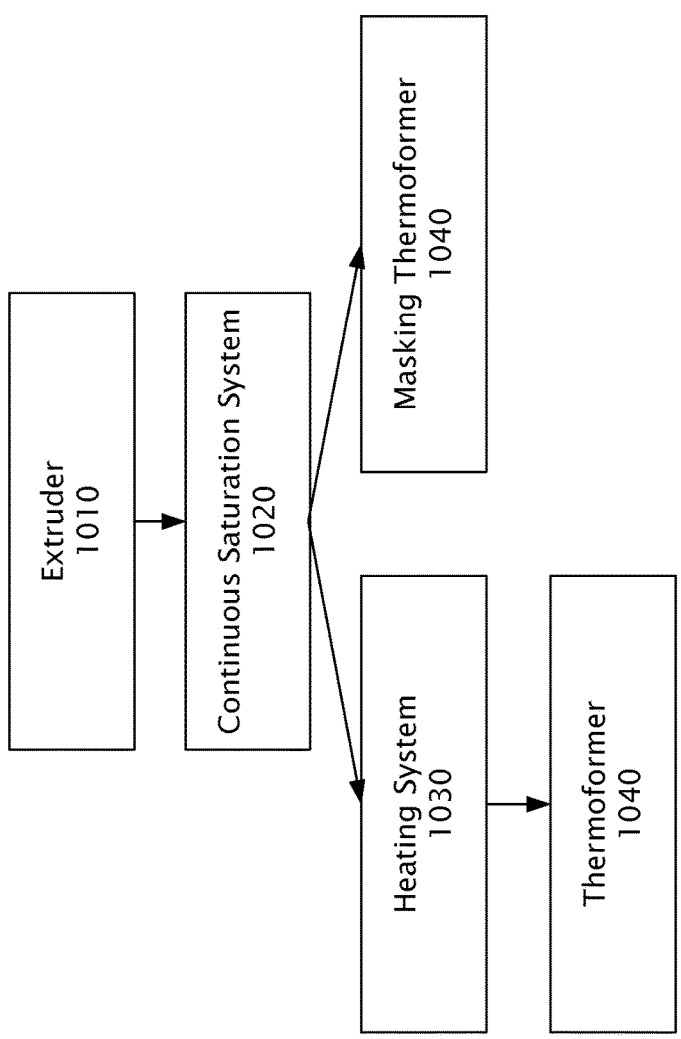
FIG. 10 is a block diagram of an arrangement of components for production of low-density thermoplastic products.

FIG. 10 is a block diagram of an arrangement of components for production of low-density thermoplastic products. Placing Continuous Saturation System 1020 immediately after Extruder 1010 may allow the continuous production of saturated sheet. One embodiment is to place Heating System 1030 after Continuous Saturation System 1020, and low-density thermoplastic products may result. A conventional thermoformer may be placed immediately after Heating System 1030, allowing continuous production of thermo-formed products.

In another embodiment a thermoformer with masked heating capabilities, Masking Thermoformer 1040, may be placed immediately after a continuous saturation system.

Figure 11:
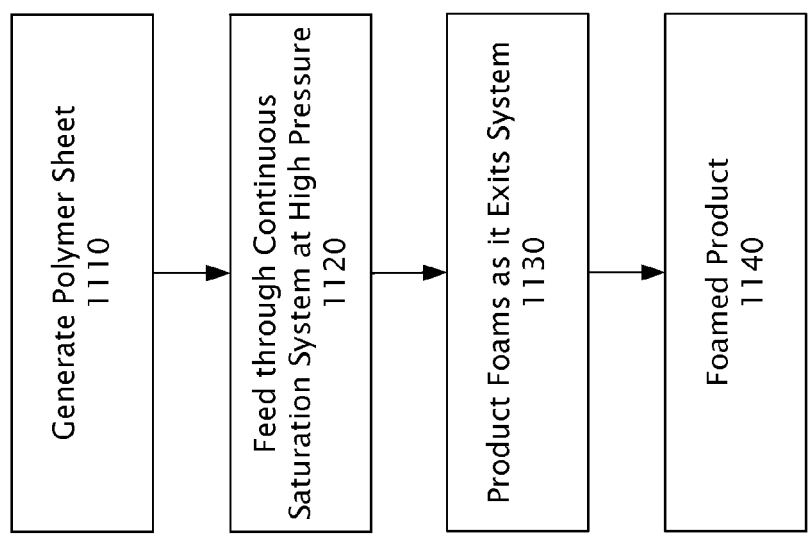
FIG. 11 is a flow diagram for steps for production of low-density thermoplastic formed products, according to another embodiment.

FIG. 11 is a flow diagram for steps for production of low-density thermoplastic formed products, according to another embodiment. Generate Polymer Sheet 1110 may be any thermoplastic, most particularly bioplastic composites as described herein. Feed Through Continuous Saturation System at High Pressure 1120 may be a step in which the polymer sheet is saturated to a point at which it reaches a sufficient gas concentration at a sufficient temperature to initiate Product Foams as it Exits System 1130. Additional heat may be applied after step 1130, which may further reduce the density of the polymer. This may generate Foamed Product 1140.

One example of this would be to expose a solid sheet of 0.02 inch thick Polycaprolactone (PCL) polymer to carbon dioxide 1100 PSI at a temperature of 33° C. in a continuous saturation system, for a sufficient amount of time to allow the PCL to at least partially saturate to a level of gas concentration that will foam once it is removed from a pressurized environment without additional heating. This may generate low-density PCL structures.

If a fluid based seal is used in this embodiment, widening the opening as the sheet traverses through the decreasing pressure differential that may exist in a fluid seal may allow for foaming in the exit portion of the fluid seal.

While the detailed description above has been expressed in terms of specific examples, those skilled in the art will appreciate that many other configurations could be used.

Accordingly, it will be appreciated that various equivalent modifications and combinations of the above-described embodiments may be made without departing from the spirit and scope of the invention.

The foregoing description of various embodiments of the invention has been presented for the purposes of illustration and description. It is not intended to be exhaustive or to limit the invention to the precise form disclosed. It is intended that the scope of the invention be limited not by this detailed description, but rather by the claims appended hereto. The above specification, examples and data provide a complete description of the manufacture and use of the invention. Since many embodiments of the invention may be made without departing from the spirit and scope of the invention, the invention resides in the claims hereinafter appended.

The invention claimed is:

1. A method, comprising:
   inserting a polylactic acid polymer material into a pressurized chamber via a first dynamic seal;
   exposing the polylactic acid polymer material in the pressurized chamber to carbon dioxide at a first pressure and a first temperature for a first time period to at least partially saturate the polylactic acid polymer material with carbon dioxide, the first time period less than about ten minutes;
   removing the polylactic acid polymer material from the pressurized chamber via a second dynamic seal; and
   heating the polylactic acid polymer material at a second pressure and a second temperature for a second time period, the second pressure less than the first pressure, and the second temperature greater than the first temperature,
   wherein at least one of the first dynamic seal and the second dynamic seal includes a sealing surface configured to maintain a gap of between about 0.002 inches and about 0.005 inches between the sealing surface and the polylactic acid polymer material.

2. The method of claim 1, wherein the polylactic acid polymer material passes through the pressurized chamber continuously.

3. The method of claim 1, wherein the first dynamic seal and the second dynamic seal are fluid seals.

4. The method of claim 1, wherein the polylactic acid polymer material has a thickness and the pressurized chamber has a height, the height of the chamber being less than twenty times the thickness of the polylactic acid polymer material.

5. The method of claim 1, wherein the polylactic acid polymer material has a higher gas concentration near a surface of the polylactic acid polymer material after the first time period.

6. The method of claim 1, wherein the polylactic acid polymer material has a higher degree of crystallinity near a surface of the polylactic acid polymer material after the first time period.

7. The method of claim 1, wherein the first dynamic seal and the second dynamic seal are water based.

8. The method of claim 1, wherein the polylactic acid polymer material includes a filler.

9. The method of claim 1, wherein the polylactic acid polymer material includes a crystallizing agent.

10. The method of claim 9, wherein the crystallizing agent includes at least one of ethylene bistearamide and talc.

11. The method of claim 10, wherein the crystallizing agent is between about 0.5% and about 40% of the polylactic acid polymer material.

12. The method of claim 1, wherein the first pressure is in a range of between about 500 to about 3,000 pounds per square inch.

13. The method of claim 1, wherein the first time period is greater than about 30 seconds.

14. The method of claim 1, wherein the second temperature is in a range of about 80° Celsius to about 110° Celsius.

15. The method of claim 1, wherein the second time period is in a range of about 15 seconds to about 60 seconds.

16. The method of claim 1, wherein a percent crystallinity of the polylactic acid polymer material is raised by less than about 10% during the first time period.

17. The method of claim 16, wherein the percent crystallinity of the polylactic acid polymer material is raised by at least about 5% during the second time period.

18. The method of claim 1, wherein the density of the polylactic acid polymer material is reduced by at least about 1% during the second time period.

19. The method of claim 1, wherein a gas diffusion gradient is generated during the first time period.

20. The method of claim 1, wherein a crystallization gradient is generated during at least one of the first time period and the second time period.

21. The method of claim 1, wherein the polylactic acid polymer material is a sheet having a thickness in a range of about 0.020" to about 0.024".

22. The method of claim 21, further comprising:
forming the polylactic acid polymer material into a three-dimensional shape.

23. A method, comprising:
inserting a polylactic acid polymer material into a pressurized chamber via a first dynamic seal;
exposing the polylactic acid polymer material in the pressurized chamber to carbon dioxide at a first pressure and a first temperature for a first time period to at least partially saturate the polylactic acid polymer material with carbon dioxide;
removing the polylactic acid polymer material from the pressurized chamber via a second dynamic seal; and
heating the polylactic acid polymer material at a second pressure and a second temperature for a second time period, the second pressure less than the first pressure, and the second temperature greater than the first temperature,
wherein at least one of the first dynamic seal and the second dynamic seal includes a sealing surface configured to maintain a gap of between about 0.002 inches and about 0.005 inches between the sealing surface and the polylactic acid polymer material.

24. The method of claim 23, wherein the first pressure is greater than about 500 psi.

25. The method of claim 23, wherein the first time period is less than about 10 minutes.

26. The method of claim 23, wherein both dynamic seals are located in a shielding environment.

27. A method, comprising:
passing a polylactic acid polymer material through a pressurized chamber from an inlet to an outlet, the inlet including a first dynamic seal and the outlet including a second dynamic seal, the polylactic acid polymer material remaining in the pressurized chamber for less than about 10 minutes, at least one of the first dynamic seal and the second dynamic seal including a sealing surface configured to maintain a gap of between about 0.002 inches and about 0.005 inches between the sealing surface and the polylactic acid polymer material;
continuously exposing the polylactic acid polymer material to carbon dioxide at a first pressure and a first temperature as the polylactic acid polymer material passes through the pressurized chamber to at least partially saturate the polylactic acid polymer material with carbon dioxide; and
heating the polylactic acid polymer material at a second pressure and a second temperature, the second pressure less than the first pressure, and the second temperature greater than the first temperature.

28. The method of claim 27, wherein the first seal and the second seal are fluid seals.

29. The method of claim 27, wherein the polylactic acid polymer material has a thickness and the pressurized chamber has a height, the height of the chamber being less than twenty times the thickness of the polylactic acid polymer material.

\* \* \* \* \*